United States Patent [19]
Matsuda et al.

[11] Patent Number: 5,449,978
[45] Date of Patent: Sep. 12, 1995

[54] LIGHTING DEVICE FOR EMITTING LIGHT WITHOUT SUBSTANTIALLY DELAYING THE LATENCY OF P300 WAVE IN HUMAN EVENT RELATED POTENTIAL

[75] Inventors: Osami Matsuda; Naoto Ogimoto, both of Okayama; Hiroyoshi Iwashima, Aichi, all of Japan

[73] Assignee: Ken Hayashibara, Okayama, Japan

[21] Appl. No.: 171,841

[22] Filed: Dec. 22, 1993

Related U.S. Application Data

[63] Continuation of Ser. No. 848,442, Mar. 9, 1992, abandoned.

[30] Foreign Application Priority Data

Dec. 6, 1991 [JP] Japan .................. 3-360401

[51] Int. Cl.⁶ .................... H05B 37/02
[52] U.S. Cl. .................... 315/194; 315/291; 315/200 R; 313/643
[58] Field of Search ............ 313/643; 315/291, 200 R, 315/205, DIG. 7, 194; 363/132

[56] References Cited

U.S. PATENT DOCUMENTS

| | | | |
|---|---|---|---|
| 2,115,480 | 4/1938 | Claude | 313/643 |
| 4,001,637 | 1/1977 | Gray | 315/200 R |
| 4,736,138 | 4/1988 | Masaki | 315/310 |
| 4,752,719 | 6/1988 | McEwan | 315/200 R |
| 5,126,636 | 6/1992 | Masaki | 315/291 |

FOREIGN PATENT DOCUMENTS

| | | |
|---|---|---|
| 0242022 | 10/1987 | European Pat. Off. . |
| 0262950 | 4/1988 | European Pat. Off. . |
| 0470750 | 12/1992 | European Pat. Off. . |
| 61-193398 | 8/1986 | Japan . |
| 62-185516 | 8/1987 | Japan . |
| 63-88792 | 4/1988 | Japan . |
| 4212290 | 8/1992 | Japan . |

OTHER PUBLICATIONS

*Noha to Kindenzu (Brain waves and Electromyogram)*, vol. 18, No. 1, pp. 60–67 (1990). "P 300 of auditory event-related potentials: the effects of development and aging humans," by Hideo Enoki, M.D.
*Clinical Electroencepholography*, vol. 31, No. 2, pp. 103–109 (1989). "P 300 in various neurological disorders", by Mikio Osawa, Shoichi Maruyama.
*Shinkei Shinpo (Advances in Neurology)*, vol. 32, No. 1, pp. 163–176 (1988). "P 300 in neurology and psychiatry", by M. Fukuda, O. Saitoh, T. Kameyama, K. Hiramatsu, and S. Niwa.

*Primary Examiner*—Robert J. Pascal
*Assistant Examiner*—Michael B. Shingleton
*Attorney, Agent, or Firm*—Browdy and Neimark

[57] ABSTRACT

Disclosed is a lighting device to emit a light which substantially does not delay the latency of P300 wave in human ERP. Such a light hardly reduces human recognition and judgement when used in illumination. This renders the lighting device very useful in various illuminations directed to improve the efficiency and accuracy in visual tasks.

6 Claims, 3 Drawing Sheets

LIGHTING DEVICE FOR EMITTING LIGHT WITHOUT SUBSTANTIALLY DELAYING THE LATENCY OF P300 WAVE IN HUMAN EVENT RELATED POTENTIAL

This application is a continuation of application Ser. No. 07/848,442 filed Mar. 9, 1992, now abandoned.

BACKGROUND OF THE INVENTION

1. Field of the Invention

This invention relates to a lighting device, in particular, to a lighting device to emit a light which hardly reduces the users' recognition and judgement when used in illumination.

2. Description of the Prior Art

In case of doing visual tasks, the use of inappropriate illumination often reduces workers' or operators' recognition and judgement. For example, when a video display terminal (VDT) task is loaded under a poor illumination, the operator hardly recognizes the fine characters and details of figures on the data displaying unit and/or keyboard, thus resulting in the increase of misoperations and/or extension of operation time which reduce operation efficiency. In the case of color coordination wherein careful distinction of colors is indispensable, the use of inappropriate illumination also results in the increase of mistask and/or extension of working time which reduces woking efficiency.

Thus, in various tasks wherein working and operation efficiencies are greatly dependent on human recognitive and judgemental faculties, it is indispensable to use an illumination which keeps these faculties in high levels.

However, past discussions on illumination have been focused on its clarity and color rendering properties and no discussion has been actually made on the relationship between illumination and human recognition and/or judgement.

SUMMARY OF THE INVENTION

This invention is to provide a lighting device which hardly reduces the users' recognition and judgement when used in illumination. To develop such a lighting device, we studied at first several parameters to quantify the reduction of human recognition and judgement due to visual tasks.

We studied the relationship between illumination and human recognition and judgement particularly with respect to the event related potential (abbreviated hereinafter as "ERP") which is known in psycointernal medicine and pediatrics as a method to clinically test patients with mental disorders and little children including babies for their recognitive and judgemental faculties. As a result, we found that when recognition and/or judgement reduces, the latency of P300 wave in human ERP delays. Also was found that such a delay advances as the reduction of recognition and judgement proceeds, as well as that the influence of illuminations on human recognition and judgement can be quantified by determining the degree of delay.

As described, for example, in Masato Fukuda et al., *Shinkei Shinpo (Advances in Neurology)*, Vol. 32, No. 1, pp. 136-176 (1988), Mikio Osawa et al., *Clinical Electroencephalography*, vol. 31, No. 2, pp. 103-109 (1989) and Hideo Enoki, *Noha to Kindenzu (Brain waves and Electromyogram)*, Vol. 18, No. 1, pp. 60-67 (1990), ERP is a potential which is induced during the processing of sensory stimulations such as visual and sonic stimulations by the cerebral cortex and consists usually of two waves. Among these waves, the positive ERP which appears at a latency of about 300 milliseconds in a human being in the normal conditions of recognition and judgement is called a "P300 wave". The negative wave which appears at a latency of about 100 milliseconds is called as "N100 wave".

Based on these findings, we screened various luminous sources and found that lights which substantially do not delay the latency of P300 wave in human ERP hardly reduce human recognition and judgement when used in illumination, as well as that such a light is suitable in lighting devices directed to improve the efficiency and accuracy in visual tasks.

In particular, this invention relates to a lighting device to emit a light which substantially does not delay the latency of P300 wave in human ERP.

DETAILED DESCRIPTION OF THE INVENTION

The wording "substantially does not delay the latency of P300 wave in human ERP" means that when tasks including visual task are loaded under light illumination, the latency of P300 wave substantially does not change before and after loading the tasks. Speaking more concretely, for example, when determined by the below described electroencephalographic procedure, the delay due to about 60-minute visual task is not more than about 7%, desirably, not more than about 5%, provided that the latency immediately before loading the visual task is regarded as 100.

Now explaining more concretely the constitutive elements of this invention, the lighting device of this invention comprises a luminous source capable of emitting a light which substantially does not delay the latency of P300 wave in human ERP, and a power source to energize the luminous source.

Incandescent lamps are suitable for such a luminous source, and any incandescent lamp can be used in this invention as long as it emits a light which substantially does not delay the latency of P300 wave in human ERP. Particular incandescent lamps are, for example, xenon gas-enclosed incandescent lamp, krypton gas-enclosed incandescent lamp and argon gas-enclosed incandescent lamp which are all excellent in luminous characteristics, easily handleable and manufactureable at low costs.

By the way, there is a close relationship between the influence of lights on human recognition and judgement and the ultraviolet components in the lights. We found that lights which are from incandescent lamps and richer in ultraviolet rays, in particular, those with a wavelength of about 290–400 nm keep human recognition and judgement in elevated levels when used in illumination. With this reason, in any type of incandescent lamps, it is preferable to use glass bulbs with an elevated transmittance for ultraviolet rays, for example, those of soft glass or quartz. For example, when incandescent lamps as luminous source are energized at a dc voltage exceeding its rating, desirably, in the range of about 105–130% thereof, the optical energy ($W/nm/cm^2$) within the above described wavelength range increases to about 2- to 10-folds, desirably, about 2- to 7-folds than in the case of energizing at their rated voltages.

Among various incandescent lamps, both xenon gas-enclosed incandescent lamp wherein a composition consisting essentially of xenon gas and nitrogen gas is enclosed in a glass bulb bearing a tungsten filament, and krypton gas-enclosed incandescent lamp wherein a composition comprising krypton gas and nitrogen gas is enclosed in a similar glass bulb are superior as the luminous source in this invention because such an incandescent lamp is extremely long in life expectancy and easily allowed to emit a light which substantially does not delay the latency of P300 wave in human ERP.

In the case of xenon gas-enclosed incandescent lamp, the composition to be enclosed in glass bulb usually contains xenon gas in an amount exceeding about 15% by volume but not exceeding about 80% by volume, desirably, in the range of about 20–75% by volume dependently on rated voltage, rated wattage and quality and finishing of the glass bulb to be used. To allow xenon gas to sufficiently exhibit its desirably luminous characteristics and extended life expectancy, it is desirable to maximize the amount of xenon gas while keeping arc starting voltage in an adequately high level. Such a composition is usually enclosed in an amount which brings the internal pressure in glass bulbs to about 700–800 torr when in incandescent state.

To allow the above described luminous sources to emit the objective light, they are usually energized at a voltage exceeding their rating, desirably, in the range of about 105—130% thereof, more desirably, at a dc voltage. Energization at a voltage outside the range tends to substantially delay the latency of P300 wave in human ERP even when the energizing voltage is dc, thus hindering the attainment of the objective. In particular, when energizing voltage is lower than the above described range, the temperature of filament decreases and the infrared components in the emitted light increase, thus the prescribed recognition and judgement are hardly retainable. While, when energizing voltage exceeds the range, although both total flux and color temperature remarkably increase, an increased glare reduces the users' recognition and judgement. Synthetically considering these and the fact that excessive energizing voltages unfavorably shorten the life expectancy of incandescent lamps, the above described voltage range would be best. In this cause, the total flux is usually set in the range of about 600–1,300 lumens dependently on uses.

Now explaining the power source to energize incandescent lamps at such a voltage, any power source can be used in this invention as long as it can supply such a voltage to incandescent lamps. For example, incandescent lamps, rated voltage of 100 or 110 V, rated wattage of 40–100 W, are energized at a dc voltage of about 105–140 V which is obtained by converting an ac from ac sources such as standard ac line into dc using rectifier circuitries bearing smoothing means such as capacitor.

Particular preferable power sources are constructed as follows:

(i) Usual power sources consisting essentially of a rectifier circuitry to convert ac into dc (ii) Switching power sources comprising a rectifier circuitry to convert ac into dc; a switching element capable of repeating ON/OFF operations at high speed and having a main current path connected with an output terminal of the rectifier circuitry; a smoothing circuitry connected with the main current path of the switching element so as to convert the high-frequency output voltage therefrom into dc; a feedback amplifier circuitry to compare the output voltage with a standard voltage; and a pulse-width modulation circuitry to modulate the pulse width of signals from the feedback amplifier circuitry so as to control the switching element in ON/OFF manner (iii) Phase control power sources comprising a rectifier circuitry to convert ac into dc, the rectifier circuitry having an input terminal connected with an ac source and also an output terminal connected with an incandescent lamp; a controlled rectifier having a main current path connected between the ac source and rectifier circuitry; and a phase control circuitry having an output terminal connected with a control electrode of the controlled rectifier so as to control its conduction based on the time interval between zero-crossovers in the ac source Power sources as disclosed, for example, in Japanese Patent Kokai No. 193,398/86, No. 185,516/87 and No. 88,792/88 are suitable for type (i) power source. Power sources as disclosed, for example, in Japanese Patent Application No. 55,743/91 are suitable for type (ii) power source.

Preferable type (iii) power sources are those which comprise a full-wave rectifier circuitry to convert ac into dc, the full-wave rectifier circuitry having an input terminal connected with an ac source and also an output terminal connected with incandescent lamp(s); a bidirectional controlled rectifier having a main current path connected between the ac source and full-wave rectifier circuitry; and a microcomputerized phase control circuitry having an output terminal connected with a control electrode of the bidirectional controlled rectifier so as to control its conduction based on the time interval between zero-crossovers in the ac source. This type of power sources exhibit an extremely stable phase control and lamp dimming functions can be easily imparted thereto. The use of microcomputerized phase control circuitries reduce the elements in electric constructive parts in lighting devices and this facilitates the size and cost reduction of high-performance lighting devices.

In every type of power sources as described above, one can provide a circuitry to limit inrush currents which may flow into filament and/or smoothing means immediately after switch-on, and/or a circuitry to limit arc discharge currents which may flow into the current path including incandescent lamp when its filament burns out. Also in this case, type (iii) power sources more effectively limit these inrush and arc discharge currents with simpler circuit constructions when the phase control circuitry is added with a soft start function and arranged to interlock with a circuitry which detects abnormal currents in the circuit including incandescent lamp.

The lighting device of this invention can be prepared into suitable shapes and arrangements to meet to its final use.

In particular, to illuminate the interior and exterior spaces of housings and buildings, for example, detached houses, apartment houses, multiple houses, libraries, schools, studios, beauty salons, hospitals, factories including plant and animal factories, company buildings, office, hotels including "ryokan (Japanese-style hotel)", restaurants, halls including banquet hall, wedding hall, conference hall, concert hall, stores and shops including department store and supermarkets, museums including art museum, airplanes, vehicles, swimming pools, gymnasiums, sports grounds, cattle sheds, poultry houses and fish farms, the above described luminous source and power source therefor are prepared into table or desk lighting devices, for example, adjustable lamp, desk lamp, hurricane lamp, table lamp and mini lamp, or into indoor or outdoor lighting devices, for example, ceiling fixture, down lamp, wall fixture, pendant, chandelier, swag lamp, floor lamp, garden lamp and gate lamp, which are then mounted or placed, for example, in study, studio, children's room, bed room, living room, dining room, kitchen, toilet room, washroom, bath room, passage, stairs, balcony, porch, reading room, school room, hall, lobby, waiting room, treating room, surgery, control room, office room, drawing room, laboratory, lounge, guest room, clerk room, cooking room, operating or driving room and cultivating room in such a housing or building.

In much more systematic uses of the lighting device according to this invention, one or more unitized lighting devices of this invention are provided in appropriate place(s) in such a housing or building, and then subjected to one or more wire or wireless control methods such as individual wiring method, personal wiring multiplex method, telephone line method, power line carrier method, optical fiber method, electric wave control method, light control method, ultrasonic control method and acoustic control method using appropriate lighting control systems bearing, for example, dimming and switching circuitries. Thus, a plurality of lighting units of this invention become susceptible of lighting pattern control, time schedule control, daylight-interlocking control, wall switch control, centralized control and/or dimming control. This is very useful in interior and exterior illuminations in large-scale housings and buildings. Particularly in household lighting, one or more lighting devices of this invention can be systematically controlled together with other electric equipments by incorporating the lighting device(s) into home bus system. In such a use, lighting devices bearing the above described type (ii) or type (iii) power source are more suitable because of the facts that they readily energize a plurality of luminous sources, that they readily supply a large power, and that their size and weight can be easily reduced.

This invention will be explained hereinafter in conjunction with the accompanying Figures.

BRIEF EXPLANATION OF THE ACCOMPANYING FIGURES

Figure 3:
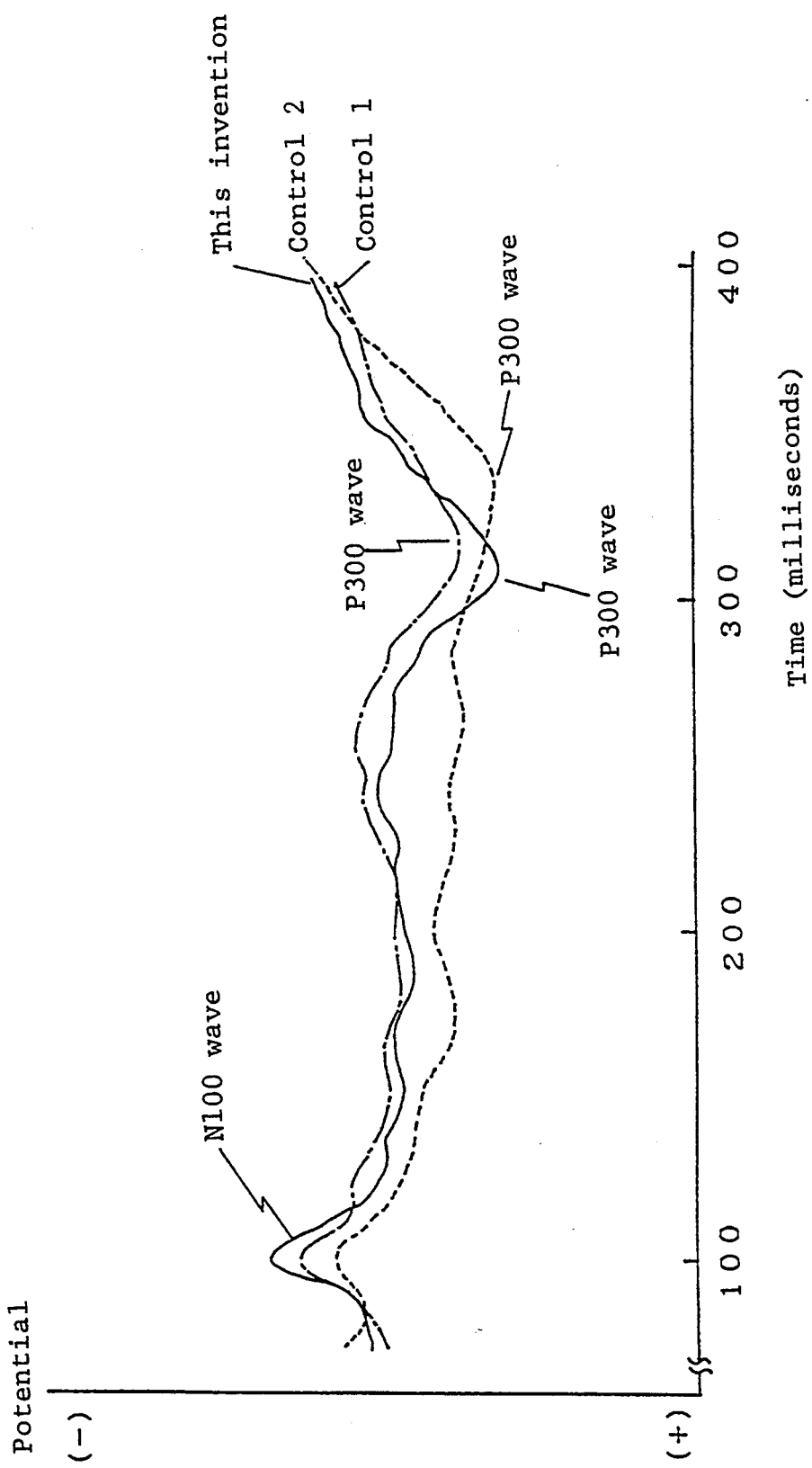

FIG. 3 is an electroencephalogram to explain the appearance of P300 wave in human ERP when a volunteer was loaded with visual task under illumination using different luminous sources. In the Figure, the solid line shows the case of this invention; the dotted line, the case of energizing incandescent lamp at its rated ac voltage (Control 1); and the alternate long and short dash line, the case of energizing three band radiation type fluorescent lamp at its rated ac voltage (Control 2).

Throughout the Figures, reference numeral 1 designates incandescent lamp; 2, abnormal current-detecting circuitry; 3, microcomputer; AC, ac source; DCR, bidirectional controlled rectifier; D1–D3, diodes; C1–C2, capacitors; R1–R4, resistors; and VR, variable resistor for lamp dimming.

DESCRIPTION OF THE PREFERRED EMBODIMENT

Figure 1:
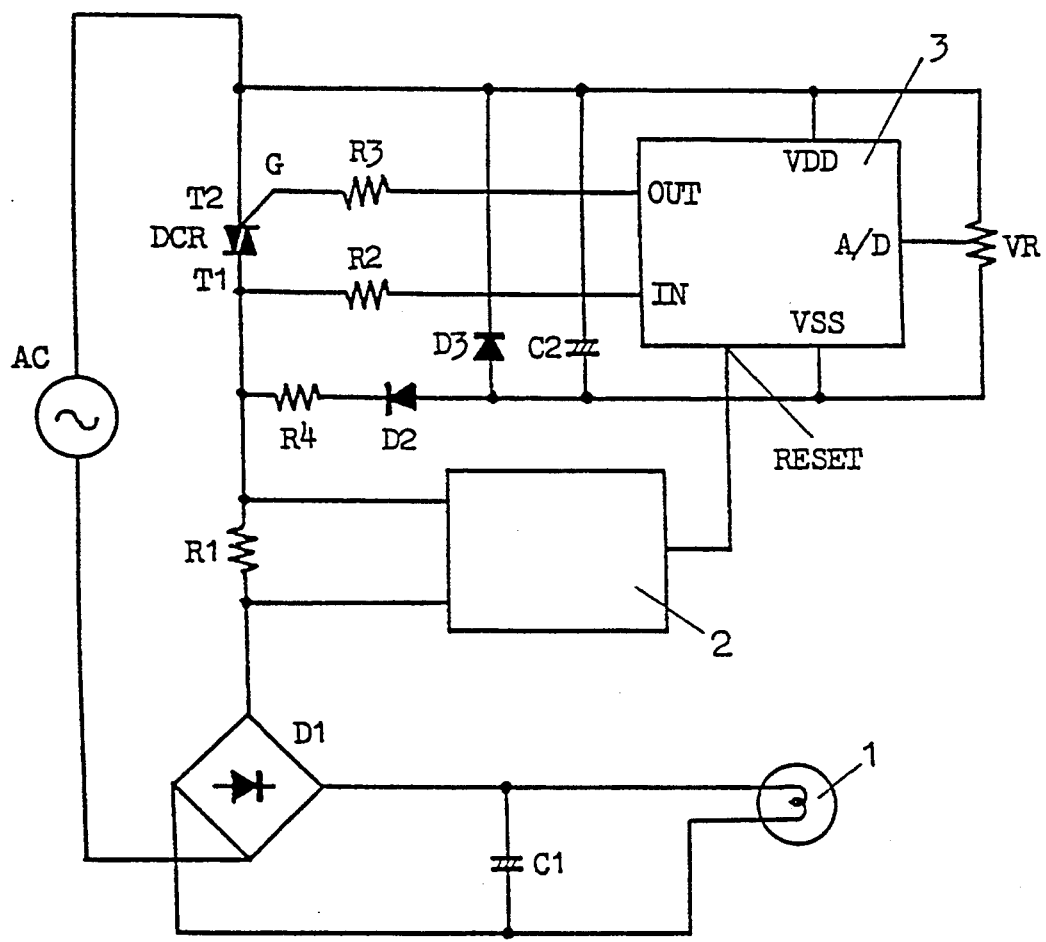
FIG. 1 is a circuit of the electric constitutive part of an embodiment according to this invention.

FIG. 1 shows an electric circuit of the electric constitutive part of an embodiment according to this invention.

In the Figure, D1 designates a bridge diode and its input terminals are connected with an ac source AC such a standard ac line. Between the bridge diode D1 and ac source AC are provided a main current path of a bidirectional controlled rectifier DCR and a resistor R1. Output terminals of the bridge diode D1 are connected in parallel with a capacitor C1 as smoothing means and one or more incandescent lamps 1.

The resistor R1 is to detect abnormal currents which may occur in the main current path and both ends of the resistor R1 are connected with input terminals of an abnormal current-detecting circuitry 2.

The reference numeral 3 designates a microcomputer to phase-control the bidirectional controlled rectifier DCR, which is usually available in IC tip form. The microcomputer 3 has a zero-crossover detection function which finds zero-crossovers in the ac source AC and measures the time interval between the zero-crossovers to determine the frequency of the ac source AC, a phase control function which supplies to a control electrode G of the bidirectional controlled rectifier DCR trigger signals where the phase angle gradually increases at a prescribed rate, and an analogue/digital conversion function which sets the phase angle in association with an external variable resistor for lamp dimming.

An ac signal input terminal IN of the microcomputer 3 is connected with a T1 terminal of the bidirectional controlled rectifier DCR through a resistor R2 so that the microcomputer 3 detects zero-crossovers in the ac source AC based on the voltage at the T1 terminal. While a trigger signal output terminal OUT of the microcomputer 3 is connected with the control electrode G of the bidirection controlled rectifier DCR through a resistor R3 so that the microcomputer 3 supplies trigger signals to the control electrode G through the resistor R3. A dimming signal input terminal A/D of the microcomputer 3 is connected with a sliding contact of a variable resistor VR for lamp dimming so that the analogue/digital conversion function sets the phase angle of the trigger signals based on the position of the sliding contact. Fixed contacts of the variable resistor VR are connected with power source terminals VDD and VSS of the microcomputer 3. The power source terminals VDD and VSS are connected with the T1 and T2 terminals of the bidirectional controlled rectifier DCR through a resistor R4 and a diode D2. The power source terminals VDD and VSS are also connected with a voltage-regulating diode D3 and a capacitor C2 in parallel, and the voltage across the T1 and T2 terminals is supplied to the diode D2 through the resistor R4 for rectification, smoothed by the capacitor C2, stabilized by the voltage-regulating diode D3 and supplied to the microcomputer 3. An output terminal of the abnormal current-detecting circuitry 2 is connected with a resetting terminal RESET of the microcomputer 3 so that when a resetting signal is supplied from the abnormal current-detecting circuitry 2, the phase control function stops to supply trigger signals, thus the bidirectional controlled rectifier DCR is brought into nonconduction.

Figure 2:
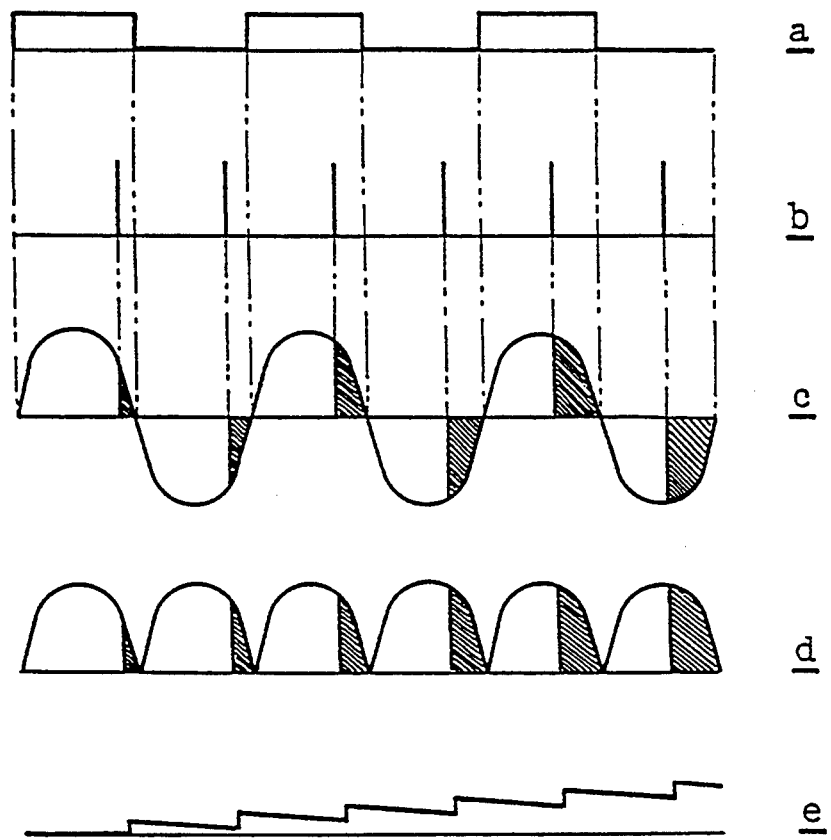
FIG. 2 is waveform charts as found in the embodiment in FIG. 1.

Now explaining the operation of this embodiment, upon switch-on, the microcomputer 3 detects forms pulses as shown in FIG. 2(a) based on zero-crossovers detected with the zero-crossover detection function and then thus determines the frequency of the ac source AC utilizing the time interval of the zero-crossovers. Thereafter, the microcomputer 3 supplies to the control electrode G of the bidirectional controlled rectifier DCR trigger pulses which delay by a prescribed time with respect to the rising and decaying edges in the ac source AC, and the bidirectional controlled rectifier DCR is energized by the trigger pulses. As shown in FIG. 2(b), the phase angle of the trigger pulses first appears in a small level, then gradually advances to a larger level over a prescribed time period. Because of this, the current across the main current path of the bidirectional controlled rectifier DCR shows a waveform where the current magnitude increases in time course as shown in FIG. 2(c). At this time, the waveform of the rectified current across the diode bridge D1 changes as shown in FIG. 2(d) with the dark shading. The rectified output of the diode bridge D1 is smoothed by the capacitor C1 and the incandescent lamp 1 is energized at a voltage whose magnitude gradually increases in time course as shown in FIG. 2(e). Generally, when the frequency of ac source is changed, then the voltage across the capacitor C1 significantly changes. In this embodiment, the voltage across the capacitor C1 is in consistent level independently of the frequency of the ac source AC because when the frequency is 50 Hz, the microcomputer 3 automatically adjusts the phase angle of trigger signals to a level larger than in the case of 60 Hz.

The voltage across the incandescent lamp 1 which has gradually increased over a prescribed time period after switch-on is fixed to a constant level as determined by the variable resistor VR. Regarding the effective value of the ac source as 100%, the voltage across the incandescent lamp 1 can be changed in the range of about 20-130% by operating the variable resistor VR.

Thus, by the use of this embodiment, the dc voltage to energize the incandescent lamp 1 stepwisely and gradually increases from zero to a prescribed constant level. Because of this, when the resistance of filament upon switch-on is lower than that in incandescent state, no inrush current flows into the filament, thus the reduction in life expectancy of the incandescent lamp 1 due to inrush currents is effectively prevented.

If the filament of the incandescent lamp 1 burns out during its use, an arc discharge occurs between the resultant filament gap and this arises in the current path including the incandescent lamp 1 a large current which may damage or destroy circuit elements. In this embodiment, dependent on the resistant value of the resistor R1, if such an arc discharge current occurs, an abnormal voltage of up to several volts arises across the resistor R1. The abnormal current-detecting circuitry 2 detects such an abnormal voltage across the resistor R1 and then sends a resetting signal to the microcomputer 3. Immediately after receiving this signal, the microcomputer 3 receives suspends trigger pulses to the bidirectional controlled rectifier DCR to bring it into nonconduction, thus cutting off the main current path and stopping arc discharge.

Thus, in this embodiment, if arc discharge occurs during its use, the circuit elements are never damaged or destroyed by the large current due to the arc discharge. Low resistors are usually used as resistor R1 so that its power consumption during normal operation is minimized.

As described above, since this embodiment is composed by using a microcomputer as main circuit element, lighting devices bearing lamp-dimming function can be made with less circuit elements and this facilitates low-cost production of lighting devices with reduced sizes and weights. Furthermore, troubles in lamp dimming of lighting devices can be remarkably reduced because microcomputers are highly tolerable to aging, variation of temperature and instability of charge/discharge circuits using resistor and capacitor. In addition, this embodiment can be used with no special care in various regions which differ in the frequency of standard ac line because this embodiment bears zero-crossover detection function, inrush current-limiting function and arc discharge current-limiting function.

Effects of this invention will be explained hereinafter in conjunction with several experiments using lighting devices as shown in Example.

Experiment 1

Several biological electrodes were cephalically put on 8 male volunteers (19-22 year old, average age of 21 year old) at Fz, Cz and Pz positions according to "10/20 Electrode System" and each volunteer was asked to enter in a room wherein six down lights as shown in Example had, been provided on the ceiling. Thereafter, the volunteers were tested for their ERP while administering a sonic stimulation through headphones using "SYNAX Model ER1100", an evoked potential measuring system manufactured by NEC San-ei Instruments, Ltd., Tokyo, Japan, and the obtained data signals were subjected to 30-time addition treatment and recorded. Oddball task was used as sonic stimulation, which has been recommended by the Japan Society of Electroencepholography and Electromyography, Commission for Evoked Potential Test Methods: In the oddball task, a high frequent stimulation using 1 kHz pure tone and a low frequent stimulation using 2 kHz pure tone were randomly represented at stimulation intervals of 0.7 Hz to give a sound pressure of 70 dB and a presentation probability for the low frequent stimulation of 20%, and the low frequent stimulation was used as target stimulation to determine ERP. Prior to the measurement, the volunteers were asked to listen to these two tones so that they clearly distincted the target stimulation, while during the measurement, the volunteers were asked to count the low frequent stimulation and, after the measurement, to report its total number. The ERP before loading visual task was determined in this way, after which the volunteers were loaded for one hour with the Kraepelin census as visual task and their ERPs after loading visual task were determined and recorded similarly as above. After the measurement, the latencies for P300 wave at Cz position were determined from the recorded data signals. The above measurement was repeated on eight different volunteers.

In this Experiment, xenon gas-enclosed incandescent lamps enclosing xenon gas and nitrogen gas in the ratio of about 7:2 by volume in a soft glass bulb with a silica coated inner surface were used as luminous source for down lights and energized at dc 116 V using power sources with a circuit as shown in FIG. 1. The visual task was loaded under conditions where the volunteers were asked to sit in natural position at a working desk, while the illuminance during visual task was set to 550±701 ux on the working desk. The measurement was started at a prescribed time in early morning where the volunteers' physiological conditions were in stabilization.

As control, a light (Control 1) obtained by energizing argon gas-enclosed incandescent lamps, rated voltage of 110 V, rated wattage of 100 W, at ac 110 V, and another light (Control 2) obtained by energizing three band radiation type fluorescent lamps, rated voltage of 100 V, rated wattage of 27 W, were tested similarly as above.

The obtained latencies for P300 wave were put into the following equation to obtain the delay rate for the latency of P300 wave.

$$\text{Delay rate (\%) for the latency of P300 wave} = \frac{A - B}{B} \times 100$$

where "A" designates the latency immediately after loading visual task, while "B" designates the latency immediately before loading visual task.

The results were as shown in Table 1 and FIG. 3. The delay rates (%) in Table 1 are the average of eight measurements, and Table 1 also lists for reference the color temperatures (K) and general color rendering indexes (Ra) for each luminous source as determined in usual manner.

TABLE 1

| Luminous Source | Delay rate (%) | Color temperature (K) | General color rendering index (Ra) |
|---|---|---|---|
| This invention | 3 | 2,900 | 100 |
| Control 1 | 10 | 2,600 | 100 |
| Control 2 | 24 | 5,900 | 84 |

As obvious from the results in Table 1, it was found that when a lighting device according to this invention was used, the delay rate in latency of P300 wave immediately after one hour visual task became very low, i.e. about 3% on average, in other words, substantially did not delay the latency of P300 wave in human ERP. This would suggest that the light from the lighting device of this invention hardly reduces the users' recognition and judgement when used in illumination.

While in the case of Control 2 using three band radiation type fluorescent lamp, the delay rate in latency immediately after loading visual task reached 24% on average, confirming that Control 2 remarkably delayed the latency of P300 wave in human ERP. In the case of Control 1 wherein argon gas-enclosed incandescent lamps were energized at rated ac voltage, a similar but not so remarkable tendency as found for Control 2 was noted and the delay rate immediately after loading visual task was as much as about 10%.

FIG. 3 shows an ERP as observed for one volunteer, indicating that the use of different luminous sources resulted in significant changes in the latency of P300 wave even when tested on the same volunteer. In particular, when visual task was loaded under an illumination using the lighting device of this invention, the latency of P300 wave almost did not change before and after loading visual task and the waveform as observed immediately after loading visual task was distinct and strong. While the latencies as found in Controls 1 and 2 were significantly much more delayed in comparison with that found in this invention, as well as tending to indistinct and weak waveforms. This was more remarkable in Control 1.

The above results would support that among lights from various lighting devices, some lights delay the latency of P300 wave in human ERP but some lights do not, as well as that the light from the lighting device of this invention substantially does not delay the latency of P300 wave in human ERP when used in illumination. The fact that as is the case of Controls 1 and 2, some lights with a good general color rendering index (Ra) and those with a high color temperature and high total flux which have been deemed more effective to recognize and judge articles as they really are substantially delayed the latency of P300 wave would suggest that, in addition to continuity, flicker, color temperature and color rendering properties in lights, their energy distribution, waveform of energizing current, total luminous flux and composition of enclosed gases delicately influences human recognition and judgement.

Although in this experiment the volunteers were loaded with the Kraepelin census as visual task, the loading of other visual tasks such as document making task, book keeping task, drawing task, VDT task, chemical analysis, process management, color coordination, book reading, video watching and the below described Landolt's ring erasing task led to similar tendencies. The results attained with krypton gas-enclosed incandescent lamp and argon gas-enclosed incandescent lamp were comparable or slightly inferior to those attained with xenon gas-enclosed lamp. In any type of these incandescent lamps, when the energizing voltages were ac or when they were dc but not higher than their rating or higher than about 130% thereof, the latency of P300 wave in human ERP wave substantially delayed.

In the below explained Experiment 2, the fact that the latency of P300 wave in human ERP closely relates to human recognition and judgement will be clarified with an experiment wherein volunteers are loaded with different visual task and then checked for the mistask rate.

Experiment 2

In this Experiment, according to the method as described in Kazuhiko Harada, *Kure Kogyo Koto Senmon Gakko Kenkyu Hokoku* (*Memoirs of the Kure Technical College*), Vol. 17, No. 1, pp. 75–78 (1981), volunteers were loaded with a visual task wherein the volunteers were asked to erase cut lines in Landolt's rings under illumination using a lighting device according to this invention, and its effects on human recognition and judgement were estimated with the obtained mistask rates (%).

In particular, 8 male volunteers with normal visual acuity and color vision (20–22 year old, average age of 22 year old) were asked to enter in a room wherein, similarly as in Experiment 1, ten down lights as shown in Example have been provided on its ceiling, and then loaded for 40 minutes with a visual task wherein the volunteers were asked to erase the cut lines in a plurality of Landolt's rings mounted on a white ground sheet. After the completion of the visual task, each ground sheet was collected and the mistask rate (%) was determined. The lighting device of this invention is evaluated for its effects on the volunteers' visual recognition and judgement based on the degree of the rate. In the determination of the mistask rates, miserased and non-erased rings were counted as mistask.

Supplementarily explaining the experimental conditions, the ground sheets as used were of a white paper with a reflectance of 90% and mounted at prescribed intervals with 448 Landolt's rings per ground sheet in eight different directions, in particular, right, off the upper right up, up, off the upper left, left, off the lower left, down and off the lower right: The outer and inner diameters of each Landolt's ring were 3.3 mm and 2.0 mm respectively, and each cut line was provided to give a visual angle of about 5 minutes at a distance of 20 cm. The 448 Landolt's rings were in either of seven Munsell colors (56 in each color), in particular, 5R4/12, 5YR6.5/12, 5Y8/12, 5Y9/3, 5G5/8, 2.5PB4/8 and 7.5P4/8, which were made of "Standard Color Sheet No. 2 for the Evaluation of Color Rendering Properties" published by the Illuminating Engineering Institute of Japan, and randomly mounted.

The visual task was loaded under conditions where the volunteers were asked to sit in natural position at a working desk laying a ground sheet, while the illuminance was set to 1,000±100 lux on the ground sheet.

Similarly as in Experiment 1, xenon gas-enclosed incandescent lamps enclosing xenon gas and nitrogen gas in the ratio of about 7:2 by volume in a soft glass bulb with a silica coated inner surface were used as luminous source for the down lights and energized at dc 116 V using a power source with a circuit as shown in FIG. 1. As control, a light (Control 1) obtained by energizing argon gas-enclosed incandescent lamps, rated voltage of 110 V, rated wattage of 100 W, at ac 110 V, and another light (Control 2) obtained by energizing three band radiation type fluorescent lamps, rated voltage of 100 V, rated wattage of 27 W, were tested similarly as in Experiment 1. The results in Table 2 were the averages for eight volunteers.

TABLE 2

| Luminous source | Mistask rate (%) | Color temperature (K) | General color rendering index (Ra) |
|---|---|---|---|
| This invention | 0.3 | 2,900 | 100 |
| Control 1 | 0.9 | 2,600 | 100 |
| Control 2 | 1.5 | 5,900 | 84 |

As shown in Table 2, it was found that when the visual task was loaded under illumination using a lighting device according to this invention, the mistask rate became extremely low, i.e. 0.3% on average. This would support that the light from the device hardly reduces human recognition and judgement when used in illumination.

While in the case of Control 2 wherein three band radiation type fluorescent lamp was energized at its rated ac voltage, the mistask rate reached about 1.5% which was about 5-fold higher than in the case of this invention, suggesting that Control 2 substantially reduced the users' recognition and judgement when used in illumination. Control 1 wherein incandescent lamp was energized at its rated ac voltage marked a mistask rate of 0.9% on average which was not so high as Control 2 but about 3-fold higher than this invention.

The above results are consistent with the relationship between type of luminous source and, delay rate for P300 wave in human ERP as shown in Experiment 1. This would support that the delay in the latency of P300 wave in human ERP has a close relationship with human recognition and judgement, as well as that as is the case of this invention, lights which substantially do not delay the latency of P300 wave in human ERP keep human recognition and judgement at higher levels when used in illumination.

In addition to the visual tasks as explained in Experiments 1 and 2, we further studied the latency of P300 wave, working or operation time, accuracy and occurrence of mistask or misoperation when workers and operators were actually loaded with practical visual tasks such as document making task, book keeping task, drawing task, VDT task, chemical analysis, process management and color coordination, confirming that the lighting device of this invention was significantly superior to both Controls 1 and 2. This would suggest that the lighting device of this invention is very effective in the improvement of efficiency and accuracy in visual tasks.

As described above, the lighting device of this invention emits a light which substantially does not delay the latency of P300 wave in human ERP. This means that the lighting device of this invention hardly reduces the users' recognition and judgement when used in illumination.

Because of this, the lighting device of this invention is suitable in the illumination for visual tasks such as document making task, book keeping task, drawing task, VDT task, chemical analysis, process management, book reading and TV and video watching wherein the workers and operators are required to carefully watch fine characters and figures over an extended time period, as well as for color coordination in designing, dress making and architecture and also for expert judgement on paintings, antiques and jewels all which need careful distinction of colors. The use of such a lighting device reduces or saves the occurrence of mistasks and/or working or operation time for visual tasks otherwise they need a relatively long working or operation time because the lighting device of this invention helps the users' to keep their recognition and management at high levels. Thus, the efficiency and accuracy in visual tasks are remarkably improved and the fatigues due to the visual tasks are reduced.

In addition, the lighting device of this invention is suitable, for example, in conferences and meetings which need creative opinions and precise judgements as well as in creative jobs such as story writing, painting and scientific researches which need creative power and concentration.

We claim:

1. In a lighting device for an incandescent lamp, the improvement wherein said device comprises an incandescent lamp selected from the group consisting of a krypton gas-enclosed lamp which contains 20–75% by volume of krypton gas and 25–80% by volume of nitrogen gas and an xenon gas-enclosed lamp which contains 20–75% by volume of xenon gas and 25–80% by volume of nitrogen gas, said incandescent lamp having a rated wattage of 40–100 w, being capable of emitting a light which substantially does not delay the latency of a P300 wave in human event related potential when energized at a dc voltage in the range of 105–130% of the rating, and having an internal glass-bulb pressure of approximately 700 to 800 torr when in an incandescent state, and a power source capable of supplying said dc voltage to said incandescent lamp.

2. In a method for emitting a light by an incandescent lamp, the improvement wherein said method comprises,
providing an incandescent lamp selected from the group consisting of a krypton gas-enclosed lamp which contains 20–75% by volume of krypton gas and 25–80% by volume of nitrogen gas and an xenon-gas enclosed lamp which contains 20–75% by volume of xenon gas and 25–80% by volume of nitrogen gas, said incandescent lamp having a rated wattage of 40–100 w, being capable of emitting a light which does not substantially delay the latency of P300 wave in human event related potential when energized at a dc voltage in the range of 105–130% of the rating, and having an internal glass-bulb pressure of about 700–800 torr when in an incandescent state;

and energizing said incandescent lamp by a power source capable of supplying said dc voltage to said incandescent lamp.

3. A method of preventing reduction of human recognition and judgement where the P300 component of event-related brain potential is generated when humans discriminate stimulus events which differ from one another in some dimension comprising providing incandescent lighting to emit light which does not substantially delay the latency of the P300 wave in human event related potential;

energizing said incandescent lighting at a dc voltage in the range of about 105–130% of its rating;

performing tasks regarding recognition and judgement in the emitted light of said incandescent lighting without a substantial delay in the latency of the P300 wave in human related potential.

4. The device of claim 1, wherein said power source comprises a rectifier circuitry to convert ac into dc, said rectifier circuitry having an input terminal connected with an ac source and also having an output terminal connected with an incandescent lamp;

a controlled rectifier having a main current path connected between said ac source and said rectifier circuitry;

and a phase control circuitry having an output terminal connected with a control electrode constituting means to control the conduction of said controlled rectifier based on the time interval between zero-crossovers in said ac source.

5. The device of claim 4, wherein said phase control circuitry is microcomputerized.

6. The device of claim 4, wherein said rectifier circuitry includes smoothing means.

* * * * *